Sept. 9, 1958          J. A. DRAKE          2,850,871
AUTOMATIC CONSTANT MACH NUMBER CONTROL SYSTEM
Filed Jan. 11, 1954          2 Sheets-Sheet 1
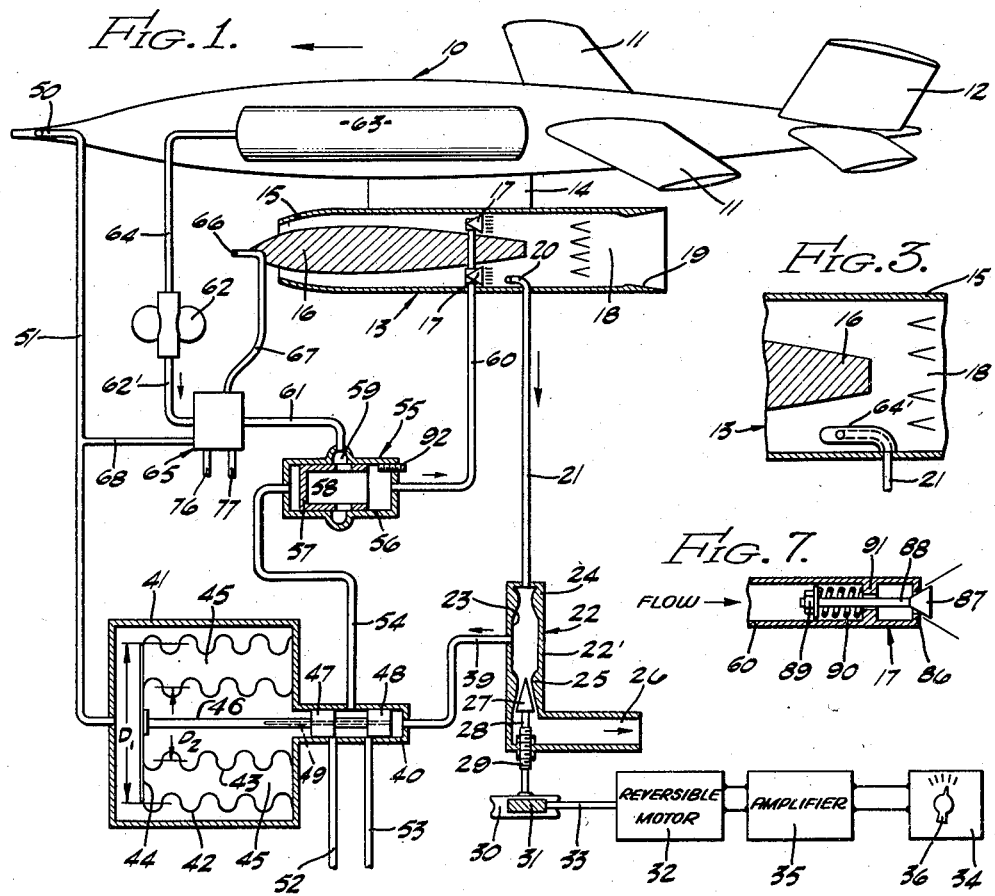
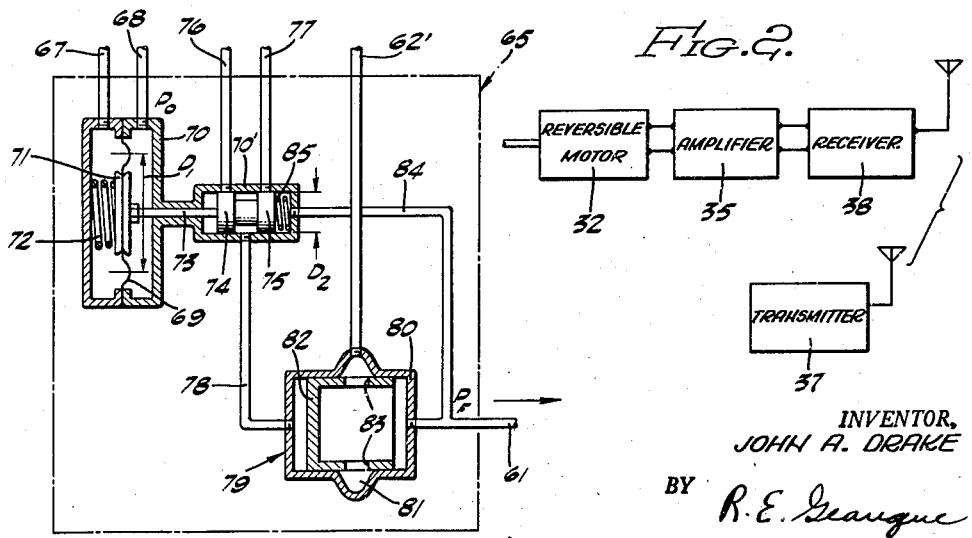
INVENTOR,
JOHN A. DRAKE
BY R. E. Geauque
ATTORNEY

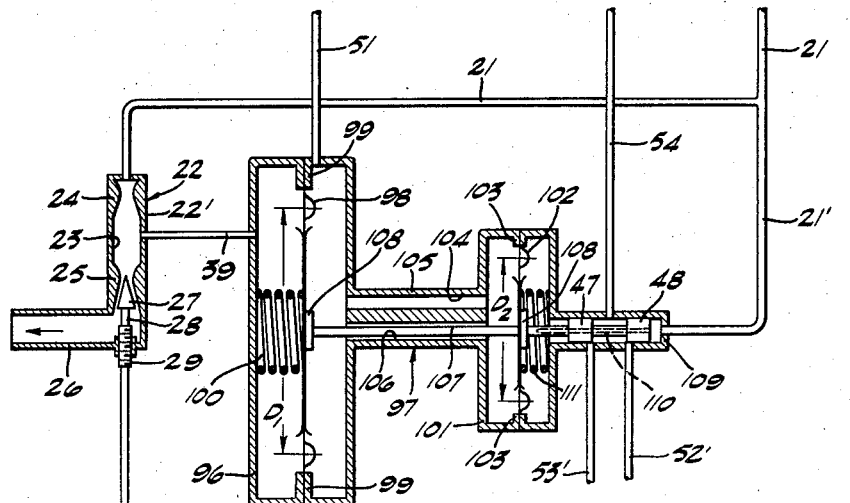
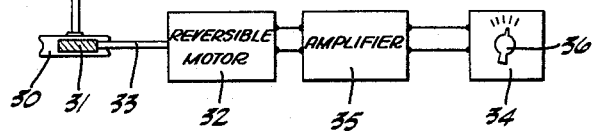
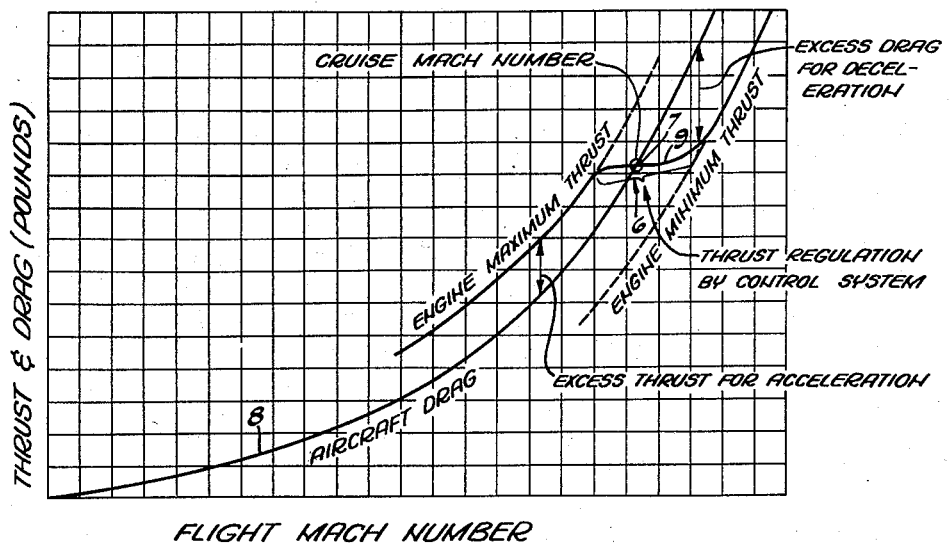
Fig. 4.
Fig. 5.

United States Patent Office 2,850,871
Patented Sept. 9, 1958

2,850,871

AUTOMATIC CONSTANT MACH NUMBER CONTROL SYSTEM

John A. Drake, Van Nuys, Calif., assignor to Marquardt Aircraft Co., Van Nuys, Calif., a corporation of California Application January 11, 1954, Serial No. 403,153

3 Claims. (Cl. 60—35.6)

This invention relates to an automatic forward flight speed or constant Mach number control system and more particularly to a Mach number control system for supersonic aircraft using ramjet or afterburning turbojet engines for propulsion.

It is important to maintain a constant flight Mach number as one means to obtain maximum range from a given fuel load and to navigate on a prescribed course. In one previous system, the thrust output of the engine is abruptly adjusted to a value equal to the drag at the desired cruise Mach number. Before this Mach number is reached, the endine is controlled to the full thrust output and the aircraft accelerates up to the cruise Mach number, and when the desired cruise Mach number is approached, the abrupt adjustment takes place with overshooting and hunting. The present invention provides many advantages over such a system by providing an engine control that maintains a constant ratio of engine diffuser exit pressure ($P_{t_2}$) to atmospheric static pressure ($P_0$). This ratio can be maintained in ramjet engines and in other types of air-breathing jet propulsion engines such as afterburning turbojet engines. The pressure ratio corresponding to the desired flight Mach number can be selected and the invention continually compares the actual pressure ratio ($P_{t2}/P_0$) to the selected ratio. Any variation between the two ratios will adjust the fuel flow in a direction to change ($P_{t_2}$) and maintain the actual and selected ratios the same. Thus, the desired cruise Mach number may be preselected before flight and may be changed during flight. The thrust will be automatically controlled to maintain a constant Mach number and therefore the invention is particularly adapted for use in pilotless aircraft. Since ($P_{t_2}$) is an indirect measure of engine thrust, this term in the pressure ratio automatically compensates for variations from design values in combustion efficiency, fuel heating value and other such factors, and the term ($P_0$) in the pressure ratio provides automatic altitude correction.

By utilizing such a control, the engine will be regulated from maximum to minimum thrust within a small Mach number range determined by the selected value of ($P_{t2}/P_0$), and the constant flight Mach number will be determined by the point at which the aircraft drag becomes equal to the engine thrust within the regulated range. Thus, any permanent small variation in the drag of the aircraft will change the cruise Mach number slightly, but the Mach number will still be held constant, even though slightly higher or lower than estimated. Also, within the regulated range, the engine fuel flow will be cut down continuously and gradually as the cruise Mach number is approached without the danger of engine flameout which results from sudden step changes in fuel flow utilized in previous systems. The percentage change of thrust with change of Mach number is approximately the same at all altitudes so that the dynamic characteristics of the present control system are unaffected by altitude changes and the control system does not require separate altitude compensation to make the dynamic performance suitable for various aircraft designs.

It is therefore an object of the present invention to provide a constant Mach number control system for air-breathing, jet propulsion engines, in which the ratio of engine diffuser exit pressure to atmospheric static pressure is automatically held constant at any preselected value.

Another object of the invention is the provision of a constant Mach number control which automatically compensates for variations in combustion efficiency, fuel heating value, altitude and other factors affecting the Mach number.

A further object of the invention is to provide a control system having dynamic characteristics which are unaffected by altitude changes.

A still further object of the invention is to provide a constant Mach number control system in which the engine thrust is continually and gradually adjusted as the aircraft approaches the cruise Mach number.

Another object is to provide a pressure ratio regulator for continually sensing the ratio of engine diffuser exit pressure to atmospheric static pressure and adjusting the fuel supply to the aircraft engine in accordance with the measured ratio.

These and other objects of the invention, not specifically enumerated above, will become readily apparent from the accompanying description and drawings in which:

Figure 1 is a diagrammatic view of an aircraft propelled by a ramjet engine and having a constant pressure ratio regulator for controlling the fuel flow.

Figure 2 is a diagrammatic view of a modification having transmitter and receiving apparatus utilized for remote adjustment of the cruise Mach number.

Figure 3 is a diagrammatic view of a modification wherein a static pressure probe is utilized in the diffuser exit of the engine instead of a total pressure probe.

Figure 4 is a diagrammatic view of another form of constant pressure ratio regulator utilized to control fuel flow.

Figure 5 is a graphical illustration of the manner in which engine thrust varies with Mach number when the ratio of engine diffuser exit pressure to atmospheric static pressure is held constant.

Figure 6 is a diagrammatic view of the fuel pressure regulator utilized to control the maximum thrust of the engine prior to regulation at the cruise Mach number.

Figure 7 is sectional view of one of the fuel nozzles for the engine.

Referring to Figure 5, it is seen that when the ratio ($P_{t2}/P_0$) is maintained constant by the control system, the engine thrust changes from maximum to minimum over a small Mach number range 6 and the point 7, where the aircraft drag curve 8 crosses the thrust curve 9, determines the cruise Mach number for the aircraft. Of course, by changing the selected ratio ($P_{t2}/P_0$), the position of the thrust curve can be varied and the point 7 positioned to correspond to any selected cruise Mach number. It is apparent that as the engine thrust approaches point 7, the control system continuously and gradually reduces the thrust without step changes in fuel flow which could cause flameout. In the event the aircraft drag curve is not estimated exactly, the point 7 could be positioned slightly to the left or the right in the figure and would correspond to a lower or higher cruise Mach number which would still be maintained constant by the control system.

One form of the invention is illustrated in Figure 1 wherein an aircraft 10, having horizontal surfaces 11 and vertical surfaces 12, mounts a ramjet engine 13 by means of bracket 14. The engine is comprised of cowling 15, diffuser inner body 16, fuel injectors 17, combustion chamber 18 and exhaust nozzle 19. It is understood that the invention is not limited to use with ramjet engines and is equally applicable to some other types of air-breathing jet propulsion engines, such as afterburning turbojet engines. A total pressure probe 20 is positioned in the engine diffuser exit to pick up the diffuser exit pressure ($P_{t_2}$) and this pressure is directed through line 21 to the pressure divider device 22. The pressure divider device consists of a casing 22′ forming a passage 23 containing an upstream restriction or choked section 24 connecting with line 21 and a downstream restriction or choked section 25 which exhausts through passage 26 to atmosphere. An adjustable needle valve 27 is positioned within the throat of restriction 25 to vary the throat area thereof. The shaft 28 for the needle valve has a portion 29 threaded to casing 22′ so that rotation of shaft 28 will move the needle valve relative to the throat of restriction 25. The end of shaft 28 carries a worm wheel 30 which is keyed to shaft 28 in a well known manner (not shown) in order to rotate the shaft and also permit axial movement of the shaft relative to the worm wheel.

The worm wheel 30 meshes with a worm gear 31 which is driven by reversible servo motor 32 through shaft 33. The motor 32 is electrically connected to the Mach number selector 34 through amplifier 35 and the motor follows the position of dial 36 of the selector in order to adjustably position the needle valve 27. While the dial 36 provides a manual adjustment which can be set before flight or by the pilot during flight, the motor can likewise be energized by radio signals sent from remote transmitter 37 to receiver 38 located on the aircraft, in which case the motor 32 will be connected to receiver 38 through amplifier 35 (see Figure 2). Also, various other types of servo systems can be utilized to select the cruise Mach number by positioning the needle valve 27.

The operation of the pressure divider device 22 is fully explained in United States Patent No. 2,645,240 granted July 14, 1953 to John A. Drake. The passage 39 connects to passage 23 at a position intermediate the restrictions 24 and 25, and with sonic velocity flow of a compressible fluid at the throats of both the restrictions, it has been determined that the pressure picked up by passage 39 is some constant fraction ($K_1$) of the pressure ($P_{t_2}$) as determined by the setting of needle valve 27. The line 39 leads to an extension 40 of casing 41 which houses concentric bellows 42 and 43 both connected at one end to the casing and at the other end to plate 44. The space 45 between the two bellows is evacuated and a stem 46 is rigidly attached at one end to plate 44 and carries, at the other end, two valve portions 47 and 48 positioned in extension 40. The stem 46 has a central passage 49 extending through the valve portions for communicating the pressure in passage 39 to the interior of bellows 43, which has an effective area of $A_2$ corresponding to the diameter $D_2$ of the bellows.

An atmospheric static pressure probe 50 is mounted at the nose of the aircraft and this pressure ($P_0$) is communicated through passage 51 to the exterior of bellows 42 so that it acts against the area $A_1$ of plate 44 corresponding to the diameter $D_1$. Thus when the forces on the plate 44 are balanced, the following equation results:

$$K_1 P_{t_2} A_2 = P_0 A_1$$

A high fluid pressure line 52 and a low fluid pressure line 53 connect with extension 40 and valve portions 47 and 48 control the communication between these lines and the passage 54 leading to throttle valve 55. The movement of valve portions 47 and 48 by the forces on plate 44 is such as to maintain the opposing forces in balance. Therefore $$\frac{K_1 P_{t_2}}{P_0} = \frac{A_1}{A_2} = K_2$$

and $$\frac{P_{t_2}}{P_0} = \frac{K_2}{K_1} = K_3$$

where $K_2$ and $K_3$ are constants. Thus, the pressure ratio ($P_{t_2}/P_0$) is maintained constant by the constant pressure ratio regulator.

The throttle valve 55 is comprised of a casing 56 containing a piston 57 having a series of openings 58 around a circumference thereof. The casing has an enlarged area 59 also around its circumference which coacts with the openings 58 to meter the fuel flow through line 60 to the fuel injectors 17. A passage 61 connects area 59 with fuel pump 62, which in turn is connected with fuel tank 63 by passage 64. It is apparent that the fuel pressure in line 60 will act against one side of piston 57 while the fluid pressure in passage 54 will act against the other side and the opening 58 will be positioned relative to area 59 in order to meter the fuel so that the force of fuel pressure will balance the fluid pressure.

If the pressure ($P_{t_2}$) is too small, the plate 44 will be moved to the right to communicate low pressure line 53 with passage 54. This will result in the fuel pressure overcoming the hydraulic pressure on piston 57 and the throttle valve will be opened to increase fuel flow to the engine. The pressure ($P_{t_2}$) will increase with increased fuel flow and will move the valve portions 47 and 48 back to neutral position in order to trap the hydraulic pressure in passage 54 at a value which will just balance the fuel pressure in line 60 downstream of the throttle valve. If ($P_{t_2}$) becomes too high, the valve portion 47 will move to connect high pressure line 52 with passage 54 so that the piston 57 will move to decrease the fuel flow and lower the pressure ($P_{t_2}$). This reduction in pressure will move the valve portions back to null position and trap a pressure in passage 54 which will balance the pressure in line 60.

It is thus apparent that the invention will maintain constant the ratio ($P_{t_2}/P_0$) which in turn will regulate the amount of thrust developed by the aircraft and the aircraft will have a cruise Mach number at which the drag of the aircraft equals the regulated thrust. The adjustment of the needle valve 27 will determine the value of the pressure ratio and thus the level at which the thrust will be regulated. Therefore, the needle valve provides a means for selecting the cruise Mach number of the aircraft. While the invention has been described as utilizing a total pressure probe in the diffuser exit, it is also possible to use, instead, a static pressure probe 64′ (see Figure 3) in order to obtain the diffuser static pressure as one of the regulation pressures since the total and static pressures at the diffuser exit are practically the same.

While the invention relates primarily to the control system just described which functions within the Mach number range 6 of Figure 5, means will now be described to control the maximum and minimum thrust of the engine during the time the control system is not functioning. The line 61 contains a fuel pressure regulator 65 which serves to control the thrust of the engine along the Engine Maximum Thrust line of Figure 5 until such time as the throttle valve 55 becomes operative over the Mach number range 6. During the time the aircraft approaches this Mach number range, the throttle valve 55 will remain in fully open position corresponding to the extreme left position of piston 57 since the pressure in line 60 will overcome that in line 54. Thus, there will be no throttling by valve 55. In order to control the thrust of the engine during this period, the fuel pressure ($P_F$) to the engine is regulated by regulator 65 so that $$P_F = K(P'_{t_0} - P_0)$$

where K is a constant, ($P'_{t_0}$) is the freestream total pressure reduced by the pressure loss associated with the normal shock ahead of probe 66 and ($P_0$) is the atmospheric static pressure.

The value ($P_{t'0}$) is obtained from the total pressure probe 66 through line 67 while the value ($P_0$) is obtained from the atmospheric static pressure probe 50 through line 68 connecting with line 51. Referring to Figure 6, the lines 67 and 68 connected with opposite side of diaphragm 69 which is secured within casing 70 and has an effective area $A_1$ corresponding to diameter $D_1$. The diaphragm has a reinforced section 71 and centering spring 72 bears between this section and the side of casing 70. A stem 73 is rigidly connected to section 71 and carries two valve portions 74 and 75 located in extension 70' of casing 70. The valve portions 74 and 75 respectively control the connection of high fluid pressure line 76 and low fluid pressure line 77 with passage 78 leading to a fuel valve 79. This fuel valve has a casing 80 with an enlarged circumferential section 81 which connects with the fuel pump 62 through line 62'. A piston 82 is located within casing 80 and contains a series of holes 83 which cooperate with section 81 to meter the fuel passing from the pump to line 61 and thereby control the value ($P_F$) in line 61. The pressure ($P_F$) is connected with one end of casing extension 70' through line 84 in order to act against area $A_2$ corresponding with diameter $D_2$ of valve portion 75. A centering spring 85 is positioned between portion 75 and the end of extension 70' for cooperation with spring 72 to center the valve portions.

When the forces acting to move the valve portions are in balance, no force results from the centering spring and the following equations result:

$$P'_{t_0}A_1 - P_0A_1 - P_FA_2 = 0$$

and $$P_F = \frac{A_1}{A_2}(P'_{t_0} - P_0)$$

where $$\frac{A_1}{A_2}$$

is the constant ($K$).

It is therefore apparent that the fuel pressure regulator 65 will control the value of ($P_F$) and of engine thrust prior to the operation of throttle valve 55 within the Mach number range 6. If the value of ($P_F$) becomes too great or too small, the valve portions 74 or 75 will uncover line 78 in order to adjust the position of piston 82 and thereby correct the value of ($P_F$). The fuel nozzles 17 (shown in detail in Figure 7) are of the type in which the fuel flow is substantially proportional to the fuel pressure ($P_F$). The line 60 terminates in a restricted section 86 which cooperates with valve head 87 to control the fuel passage opening. The valve head 87 is carried at one end of a stem 88 and a nut 89 is secured to the other end to receive the force of spring 90 positioned about the stem. The spring 90 likewise bears against an internal projection 91 within line 60 and it is apparent that the pressure ($P_F$) will operate against spring 90 to vary the opening of the fuel valve.

In order to control the minimum thrust of the engine, an adjustable stop screw 92 is threaded to casing 56 and projects into the path of piston 57 to limit the movement of the piston in the direction to reduce fuel flow through valve 55. Thus, sufficient fuel flow will be maintained to prevent flameout of the engine. It is apparent that other systems can be utilized in connection with the constant Mach number control system of the present invention, for controlling the maximum and minimum thrust of the engine when the control system is not functioning to maintain a constant forward flight speed.

Another form of pressure regulator for use in the control system of the invention is illustrated in Figure 4, wherein like reference numerals designate like parts as in the previous modification. The engine diffuser exit pressure ($P_{t_2}$) is directed through line 21 to the pressure divider device 22 which operates in the same manner as in the previous embodiment to give a pressure in line 39 which is some constant fraction of the pressure ($P_{t_2}$) as determined by the position of needle valve 27 in the throat of restriction 25. Also, the needle valve is positioned in the same manner, either by selector dial 36 or by a receiver 38. The pressure ($K_1P_{t_2}$) in line 39 enters enlargement 96 of casing 97 and acts against one side of diaphragm 98 mounted within enlargement 97 by rigid support 99. A spring 100 likewise bears against the same side of diaphragm 98 and atmospheric static pressure ($P_0$) is introduced to the other side of the diaphragm 98 through line 51. The casing 97 has a second enlargement 101 which contains a second diaphragm 102 mounted by support 103 and one side of this diaphragm is connected to the pressure ($P_0$) on diaphragm 98 through a passage 104 in a connecting section 105 of casing 97. The section 105 has a second passage 106 for receiving a stem 107 which is rigidly connected to both diaphragms 98 and 102 by means of members 108. The stem 107 projects into extension 109 of casing 97 and carries valve portions 47 and 48 which control high fluid pressure line 52' and low fluid pressure line 53', respectively, in order to adjust the fluid pressure in line 54 leading to an engine fuel throttle valve of the type illustrated in connection with the previous embodiment.

The passage 21 has a branch 21' which connects with the end of extension 109 and the stem 107 has a passage 110 through the valve portions in order to communicate the pressure ($P_{t_2}$) in passage 21' with the side of a diaphragm 102 opposite that which connects with passage 104. A spring 111 continually exerts a force against the diaphragm 102 in the same direction as pressure ($P_{t_2}$) supplied by passage 110.

The pressure ($P_{t_2}$) acts against area $A_1$ of diaphragm 98 corresponding to diameter $D_1$ and against area $A_2$ of diaphragm 102 corresponding to diameter $D_2$. Also, the pressure ($P_0$) acts against area $A_2$ and area $A_1$ and the force of springs 100 and 111 oppose each other. The springs 100 and 111 serve as centering spring and exert no force when the valve portions are centered. Therefore, the following equation results when the forces tending to move stem 107 are in balance:

$$K_1P_{t_2}A_1 - P_{t_2}A_2 = P_0A_1 - P_0A_2$$

or $$P_{t_2}(K_1A_1 - A_2) = P_0(A_1 - A_2)$$

and therefore $$\frac{P_{t_2}}{P_0} = \frac{A_1 - A_2}{K_1A_1 - A_2} = K_2 \text{ (constant)}$$

As previously described, the value of constant ($K_1$) can be varied by changing the position of needle valve 27 and therefore, the value of constant ($K_2$) can be varied in the same manner. Thus, the pressure ratio regulator serves to maintain a constant pressure ratio between diffuser exit pressure ($P_{t_2}$) and atmospheric static pressure ($P_0$) so that the aircraft engine will be controlled in the same manner as in the previous embodiment. If the pressure ($P_{t_2}$) becomes too large, the valve portion 48 will open passage 54 to high pressure line 52' in order to increase the pressure in passage 54 and reduce the amount of fuel supplied to the engine. However, if the pressure ($P_{t_2}$) becomes too small, the valve portion 47 will open passage 54 to low pressure line 53' in order to decrease the pressure in passage 54 and increase the fuel supply to the engine.

By the present invention, it is possible to control the thrust output of an aircraft engine by maintaining the pressure ratio ($P_{t_2}/P_0$) at a constant value and thereby automatically maintaining the cruise Mach number at a constant value corresponding to the value at which the aircraft drag line intersects the regulated thrust line.

The pressure ratio regulators which have been described are generally useful in any type of pressure system as well as in connection with the present invention of which they form a part and it is understood that diaphragms of the regulators can be replaced by pistons and other equivalent structures. By the use of a pressure divider device, any cruise Mach number can be selected either before or during flight. The control system is simple in construction and operation and has the many advantages heretofore listed. Other methods of maximum and minimum thrust regulation can be utilized in connection with the constant flight speed control to prevent the engine from reaching too rich a fuel-air mixture or from reducing fuel-air mixture to the point where flameout occurs.

Various modifications of the invention are contemplated and may obviously be resorted to by those skilled in the art without departing from the spirit and scope of the invention, as hereinafter defined by the appended claims.

What is claimed is:

1. In an automatic constant flight speed control system for a jet engine, a fuel valve connected with the fuel injectors for said engine, a fuel regulator connected with said fuel valve and supplying fuel thereto, said fuel regulator having means for sensing the difference between freestream pitot pressure and atmospheric static pressure to control the maximum thrust of said engine when said fuel valve is in wide open position, and a pressure ratio regulator having means for sensing the ratio between engine diffuser exit pressure and atmospheric static pressure to control said fuel valve within a selected Mach number range so that the ratio between atmospheric static pressure and diffuser exit pressure is maintained constant.

2. In a control system as defined in claim 1 having stop means for said fuel valve in order to prevent said fuel valve from reducing the thrust of the engine below a desired minimum.

3. A control system for maintaining a constant flight speed by controlling the thrust of a jet engine, comprising a fuel valve connected with said engine, a fuel line connected with said fuel valve and supplying fuel thereto, a pressure ratio regulator having means for sensing the ratio between engine diffuser exit pressure and atmospheric static pressure, said pressure ratio regulator being connected to said fuel valve to regulate the fuel flow in accordance with said ratio over a selected Mach number range, and a fuel regulator in said fuel line having means for sensing the difference between freestream pitot pressure and atmospheric static pressure to control the fuel flow to said fuel valve during flight at Mach numbers below said selected Mach number range.

References Cited in the file of this patent

UNITED STATES PATENTS

| | | |
|---|---|---|
| 549,407 | Vail | Nov. 5, 1895 |
| 596,601 | Knox | Jan. 4, 1898 |
| 2,312,191 | Reader | Feb. 23, 1943 |
| 2,477,233 | Bristol | July 26, 1949 |
| 2,479,813 | Chamberlin et al. | Aug. 23, 1949 |
| 2,550,678 | Deacon | May 1, 1951 |
| 2,566,319 | Deacon | Sept. 4, 1951 |
| 2,635,581 | Karig | Apr. 21, 1953 |
| 2,642,237 | Page et al. | June 16, 1953 |
| 2,645,240 | Drake | July 14, 1953 |
| 2,652,859 | Murphy | Sept. 22, 1953 |
| 2,654,995 | Ostroff | Oct. 13, 1953 |
| 2,669,838 | Lee | Feb. 23, 1954 |
| 2,671,620 | Andrews | Mar. 9, 1954 |
| 2,688,229 | Lee | Sept. 7, 1954 |
| 2,761,278 | Jonas et al. | Sept. 4, 1956 |